(12) United States Patent
Fukuda et al.

(10) Patent No.: US 10,526,982 B2
(45) Date of Patent: Jan. 7, 2020

(54) INTERNAL COMBUSTION ENGINE WITH SUPERCHARGER FOR SADDLE-RIDE TYPE VEHICLE

(71) Applicant: HONDA MOTOR CO., LTD., Tokyo (JP)

(72) Inventors: Masayuki Fukuda, Wako (JP); Kenichi Omori, Wako (JP); Masaru Odajima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 386 days.

(21) Appl. No.: 15/456,126

(22) Filed: Mar. 10, 2017

(65) Prior Publication Data
US 2017/0284319 A1  Oct. 5, 2017

(30) Foreign Application Priority Data
Mar. 30, 2016  (JP) ................. 2016-069445

(51) Int. Cl.
*F02D 41/00* (2006.01)
*F02D 11/10* (2006.01)
(Continued)

(52) U.S. Cl.
CPC .......... *F02D 41/0007* (2013.01); *B60K 13/02* (2013.01); *B62K 11/00* (2013.01); *B62K 11/04* (2013.01); *F02B 33/40* (2013.01); *F02B 39/04* (2013.01); *F02B 39/06* (2013.01); *F02B 61/02* (2013.01); *F02B 75/22* (2013.01); *F02D 9/1055* (2013.01); *F02D 11/10* (2013.01); *F02M 35/10157* (2013.01); *F02M 35/116* (2013.01);
(Continued)

(58) Field of Classification Search
CPC ..... F02D 41/0007; B62K 11/00; B62K 11/04; F02B 75/22
See application file for complete search history.

(56) References Cited

U.S. PATENT DOCUMENTS 5,263,463 A  11/1993  Perry
6,105,558 A  8/2000  Bushling
(Continued)

FOREIGN PATENT DOCUMENTS

DE  3344024 A1  12/1984
EP  2631455 A1  8/2013
(Continued)

OTHER PUBLICATIONS

Extended European Search Report issued in European Application No. 17159305.6, dated Jun. 12, 2017.
(Continued)

*Primary Examiner* — Ngoc T Nguyen
(74) *Attorney, Agent, or Firm* — Birch, Stewart, Kolasch & Birch, LLP

(57) ABSTRACT

An internal combustion engine 31 for a motorcycle includes a supercharger 63 arranged above a crankcase 81 positioned below a front cylinder head 92 of a front bank 31A and a rear cylinder head 97 of a rear bank 31B. In the internal combustion engine 31 for the motorcycle, the crankcase 81 is covered with a case cover 116 from the outside in a vehicle width direction, and the supercharger 63 is supported by a supercharger supporting portion 116a provided above the case cover 116.

16 Claims, 10 Drawing Sheets

(51) Int. Cl.
| | | |
|---|---|---|
| *F02M 35/16* | (2006.01) | |
| *F02M 35/10* | (2006.01) | |
| *F02D 9/10* | (2006.01) | |
| *F02B 39/06* | (2006.01) | |
| *F02M 35/116* | (2006.01) | |
| *B60K 13/02* | (2006.01) | |
| *B62K 11/00* | (2006.01) | |
| *F02B 33/40* | (2006.01) | |
| *B62K 11/04* | (2006.01) | |
| *F02B 39/04* | (2006.01) | |
| *F02B 61/02* | (2006.01) | |
| *F02B 75/22* | (2006.01) | |
| *F02F 7/00* | (2006.01) | |

(52) U.S. Cl.
CPC ......... *F02M 35/162* (2013.01); *F02F 7/0068* (2013.01); *F02F 2007/0075* (2013.01); *Y02T 10/144* (2013.01)

(56) References Cited

U.S. PATENT DOCUMENTS

| | | |
|---|---|---|
| 7,549,493 B1 | 6/2009 | Jones |
| 2015/0275743 A1 | 10/2015 | Ohmori et al. |
| 2017/0284288 A1* | 10/2017 | Mukohara ............... F01L 1/047 |

FOREIGN PATENT DOCUMENTS

| | | |
|---|---|---|
| JP | 58-174120 A | 10/1983 |
| JP | 2-70920 A | 3/1990 |
| JP | 3-119545 U | 12/1991 |
| JP | 2013-204544 A | 10/2013 |
| WO | WO 2014/041945 A1 | 3/2014 |

OTHER PUBLICATIONS

Japanese Office Action issued in Japanese Application No. 2016-069445 dated Sep. 19, 2017, together with an English translation.
European Communication pursuant to Article 94(3) EPC, for European Application No. 17159305.6, dated Mar. 5, 2018.

\* cited by examiner

INTERNAL COMBUSTION ENGINE WITH SUPERCHARGER FOR SADDLE-RIDE TYPE VEHICLE The present application claims priority under 35 U.S.C. § 119 to Japanese Patent Application No. 2016-069445 filed on Mar. 30, 2016. The content of the application is incorporated herein by reference in its entirety.

TECHNICAL FIELD

The present invention relates to an internal combustion engine with a supercharger for a saddle-ride type vehicle.

BACKGROUND ART

The existing internal combustion engine with a supercharger for a saddle-ride type vehicle is known (for example, see Patent Literature 1). The existing internal combustion engine with the supercharger for the saddle-ride type vehicle is configured in such a manner that the supercharger is arranged behind a cylinder head and the supercharger is arranged in a position of a rear portion of a crankcase.

CITATION LIST

Patent Literature

[Patent Literature 1] WO 2014/041945

SUMMARY OF INVENTION

Technical Problem

In the above-described Patent Literature 1, it is conceivable that the position of the supercharger is one of the optimum positions in consideration of a vehicle body space in the saddle-ride type vehicle having the limited vehicle body space; however, a place suited to arrangement of the supercharger is not found except the rear portion of the crankcase positioned below the cylinder head. As a result, the degree of freedom in layout design is reduced.

In such an arrangement structure of the supercharger, since an intake chamber as an auxiliary machine component for the internal combustion engine is arranged above the crankcase, it is necessary to assemble the supercharger from above the crankcase before assembling the auxiliary machine component, and assemblability and productivity are limited. With that, even in the saddle-ride type vehicle having the limited vehicle body space in comparison with an automobile, the internal combustion engine with the supercharger taking the assemblability and the productivity in consideration is required.

An object of the present invention is to provide an internal combustion engine with a supercharger for a saddle-ride type vehicle configured to improve assemblability and productivity.

Solution to Problem

In order to address the above-described problem, according to an aspect of the present invention, there is provided an internal combustion engine with a supercharger for a saddle-ride type vehicle, the supercharger (63) being arranged above a crankcase (81) positioned below a cylinder head (92, 97). In the internal combustion engine with the supercharger for the saddle-ride type vehicle, the crankcase (81) is covered with a case cover (116) from the outside in a vehicle width direction, and the supercharger (63) is supported by the case cover (116).

In the above-described structure, the supercharger (63) may be transmitted with power through a power transmission portion (83) from a crankshaft (82) stored in the crankcase (81), and the case cover (116) may be a power transmission portion cover for covering the power transmission portion (83).

Also, in the above-described structure, the internal combustion engine may be a direct injection internal combustion engine for directly injecting fuel into a cylinder (91a, 96a) provided with respect to a cylinder block (91, 96), and a high-pressure fuel pump (117) for fuel injection may be attached to the case cover (116) and the high-pressure fuel pump (117) also may be arranged to overlap with the cylinder block (96) in a side view.

Also, in the above-described structure, a drive shaft (103) may be rotatably supported by the crankcase (81), the drive shaft (103) may be formed with a cam lobe (103a) for driving the high-pressure fuel pump (117), and rotation of the crankshaft (82) may be transmitted to the drive shaft (103) by engaging a drive gear (118) and a driven gear (109) with each other, the drive gear (118) being provided to the crankshaft (82), the driven gear (109) being provided to the drive shaft (103).

Also, in the above-described structure, an air cleaner case (158) may be arranged above the cylinder head (92), and a bypass valve device (138) and a TBW throttle device (132) may be arranged between the air cleaner case (158) and the cylinder head (92), the bypass valve device (138) adjusting supercharging pressure of the supercharger (63), the TBW throttle device (132) opening/closing a throttle valve (132b) by an actuator (132a) according to a throttle signal.

Also, in the above-described structure, the bypass valve device (138) and the TBW throttle device (132) may overlap with each other in the side view.

Also, in the above-described structure, the internal combustion engine may be a V-type internal combustion engine including a front bank (31A) and a rear bank (31B), and the supercharger (63) may be arranged between the front bank (31A) and the rear bank (31B).

Also, in the above-described structure, one of the front bank (31A) and the rear bank (31B) may be provided with the TBW throttle device (132), the other of the front bank (31A) and the rear bank (31B) may be provided with a throttle device (133), throttle valves (132b, 133b) may be interlocked with each other by a coupling member (144), the throttle valves (132b, 133b) being respectively provided to the TBW throttle device (132) and the throttle device (133), and the coupling member (144) may be arranged inside of a pipe (136) in the vehicle width direction, the pipe (136) being connected to the supercharger (63).

Also, in the above-described structure, the case cover (116) may be provided with a crankcase cover portion (116e) and a gear storage portion (116b), the crankcase cover portion (116e) covering a lateral side of the crankcase (81), the gear storage portion (116b) protruding outward of the crankcase cover portion (116e) in the vehicle width direction and the gear storage portion (116b) storing a gear (145, 146, 147) included in the power transmission portion (83). The high-pressure fuel pump (117) may be arranged outside of the crankcase cover portion (116e) in the vehicle width direction and the high-pressure fuel pump (117) also may be attached to a rear portion of the gear storage portion (116e).

Advantageous Effects of Invention

The crankcase of the aspect of the present invention is covered with the case cover from the outside in the vehicle width direction, and the supercharger is supported by the case cover. For this reason, in the saddle-ride type vehicle having the limited vehicle body space in comparison with the automobile, the supercharger is supported by the case cover from the outside in the vehicle width direction. As a result, with the supercharger attached in a sub-assembling manner to the case cover, the case cover can be assembled to the crankcase from the outside in the vehicle width direction. In this way, the supercharger can be easily assembled to the crankcase through the case cover, and even if the auxiliary machine component or the like of the internal combustion engine is arranged above the crankcase, the assemblability and the productivity of the supercharger can be improved.

Also, the supercharger is transmitted with power through the power transmission portion from the crankshaft stored in the crankcase, and the case cover is the power transmission portion cover for covering the power transmission portion. For this reason, the number of components can be reduced by covering the power transmission portion with the case cover supporting the supercharger. Also, since economical layout can be achieved, the assemblability and the productivity can be improved.

Also, the internal combustion engine is the direct injection internal combustion engine for directly injecting fuel into the cylinder provided with respect to the cylinder block, the high-pressure fuel pump for fuel injection is attached to the case cover, and the high-pressure fuel pump is also arranged to overlap with the cylinder block in the side view. With this arrangement, since the high-pressure fuel pump is positioned on the lateral side of the cylinder block, the power can be easily transmitted from the crankshaft, and the structure of the internal combustion engine can be further simplified.

Also, the drive shaft is rotatably supported by the crankcase, the drive shaft is formed with the cam lobe for driving the high-pressure fuel pump, and the rotation of the crankshaft is transmitted to the drive shaft by engaging the drive gear and the driven gear with each other, the drive gear being provided to the crankshaft, the driven gear being provided to the drive shaft. For this reason, the power can be transmitted from the crankshaft to the drive shaft by the simple structure.

Also, the air cleaner case is arranged above the cylinder head, and the bypass valve device and the TBW throttle device are arranged between the air cleaner case and the cylinder head, the bypass valve device adjusting supercharging pressure of the supercharger, the TBW throttle device opening/closing the throttle valve by the actuator according to a throttle signal. With this arrangement, since the bypass valve device and the TBW throttle device are arranged between the air cleaner case and the cylinder head, the limited vehicle body space in the saddle-ride type vehicle can be effectively used.

Also, the bypass valve device and the TBW throttle device overlap with each other in the side view. For this reason, the limited vehicle body space in the saddle-ride type vehicle can be effectively used.

Also, the internal combustion engine is the V-type internal combustion engine including the front bank and the rear bank, and the supercharger is arranged between the front bank and the rear bank. For this reason, the limited vehicle body space in the saddle-ride type vehicle can be effectively used.

Also, one of the front bank and the rear bank is provided with the TBW throttle device, the other of the front bank and the rear bank is provided with a throttle device, and throttle valves are interlocked with each other by the coupling member, the throttle valves being respectively provided to the TBW throttle device and the throttle device. The coupling member is arranged inside of the pipe in the vehicle width direction, the pipe being connected to the supercharger. For this reason, the coupling member can be protected by the pipe by arranging the coupling member on an inner side of the pipe in the vehicle width direction. Also, the vehicle body space located inside of the pipe in the vehicle width direction in the saddle-ride type vehicle can be effectively used.

Also, the case cover is provided with the crankcase cover portion and the gear storage portion, the crankcase cover portion covering the lateral side of the crankcase, the gear storage portion protruding outward of the crankcase cover portion in the vehicle width direction, the gear storage portion storing the gear included in the power transmission portion. The high-pressure fuel pump is arranged outside of the crankcase cover portion in the vehicle width direction, and the high-pressure fuel pump is also attached to the rear portion of the gear storage portion. For this reason, the high-pressure fuel pump can be protected from an interference object from the lateral side of the vehicle by the gear storage portion. Also, the vehicle body space outside of the crankcase cover portion in the vehicle width direction and behind the gear storage portion can be effectively used.

DESCRIPTION OF EMBODIMENTS

An embodiment of the present invention will be described below with reference to drawings. Note that in the explanation, description of directions such as front and rear, right and left, and upper and lower is the same direction with respect to a vehicle body unless otherwise specially described. Also note that in the respective drawings, a reference sign FR is indicative of a front side of the vehicle body, a reference sign UP is indicative of an upper side of the vehicle body, and a reference sign LH is indicative of a left side of the vehicle body.

Figure 1:
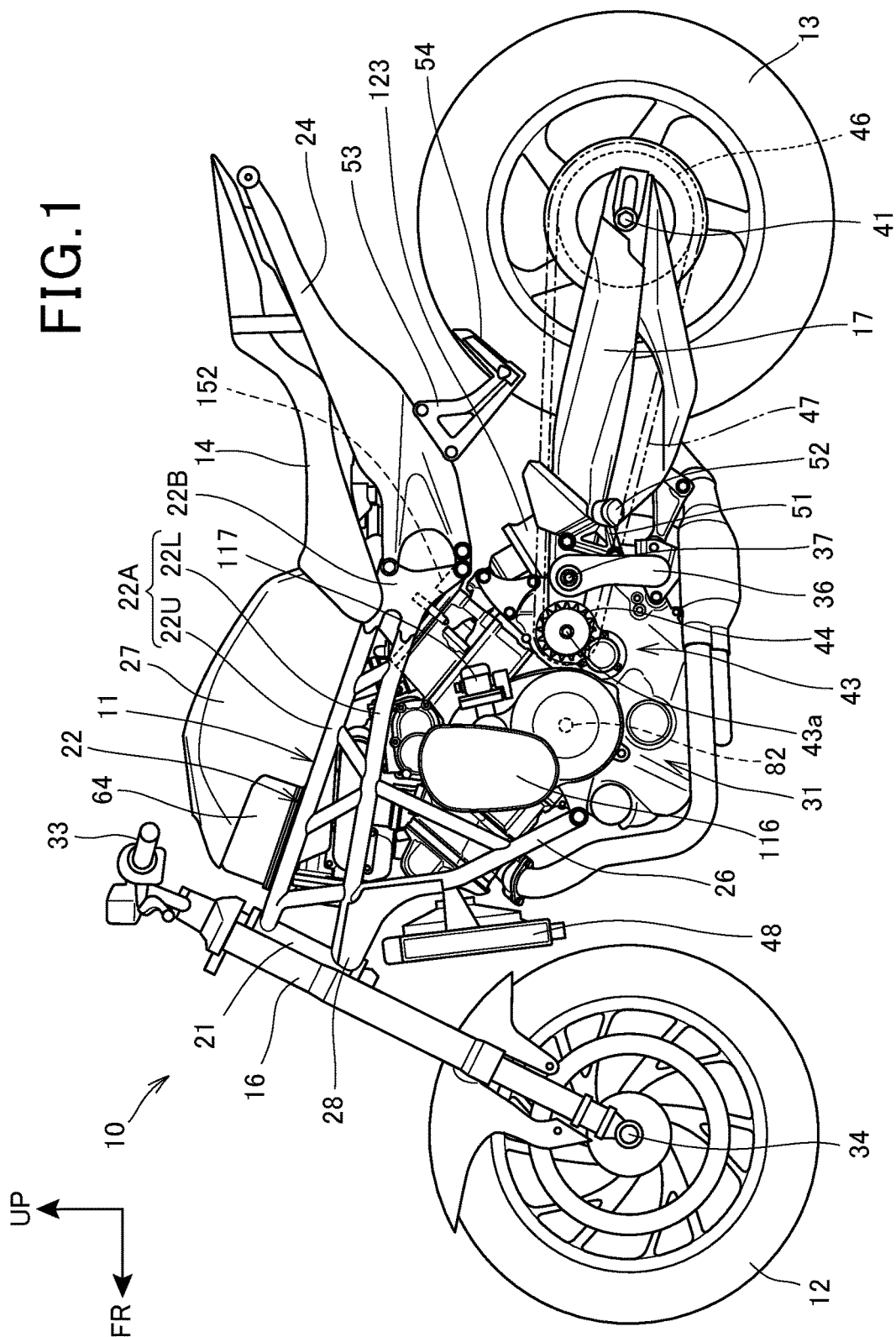
FIG. 1 is a left side view of a motorcycle mounted with an internal combustion engine according to the present invention.

FIG. 1 is a left side view of a motorcycle 10 mounted with an internal combustion engine 31 according to the present invention.

The motorcycle 10 is a saddle-ride type vehicle including a vehicle body frame 11, a front wheel 12, a rear wheel 13, and a seat 14.

The front wheel 12 is supported at a front end of the vehicle body frame 11 as a framework through a front fork 16. The rear wheel 13 is supported by a center lower portion of the vehicle body frame 11 through a swing arm 17. The seat 14 is attached to an upper rear portion of the vehicle body frame 11.

The vehicle body frame 11 is provided with a head pipe 21, a pair of right and left main frames 22, a seat frame 24, and a pair of right and left down frames 26.

The right and left main frames 22 are configured with right and left pipe frame portions 22A and a pair of right and left rear end frame portions 22B, the right and left pipe frame portions 22A being configured in such a manner that two pipe members 22U, 22L extend rearward and downward to the rear from the head pipe 21, the pair of right and left rear end frame portions 22B being attached to rear ends of the right and left pipe frame portions 22A. The two pipe members 22U, 22L are arranged at a distance in a vertical direction, and the pipe members 22U, 22L are connected to each other through a plurality of reinforcing pipes. A fuel tank 27 is mounted on an upper portion of the right and left main frames 22.

The seat frame 24 has an upper portion and a lower portion of a front end, the upper portion and the lower portion being connected to right and left rear end frame portions 22B of the main frames 22. The seat frame 24 extends rearward and upward from the rear end frame portions 22B, and the seat frame 24 supports the seat 14 located adjacently behind the fuel tank 27.

The right and left down frames 26 extend respectively downward from the front portions of the right and left lower pipe members 22L. The upper portions of the down frames 26 are connected to the head pipe 21 together with front portions of the pipe members 22L through a reinforcing member 28.

The right and left down frames 26 support the internal combustion engine 31 together with the right and left main frames 22 (detailedly, the right and left rear end frame portions 22B).

The front fork 16 is steerably supported by the head pipe 21. A handlebar 33 is supported at an upper end of the front fork 16, and a front wheel 12 is supported at a lower end of the front fork 16 through an axle 34.

A pivot supporting member 36 is attached to a lower portion of the internal combustion engine 31, and the swing arm 17 is vertically swingably supported by a pivot shaft 37 provided to the pivot supporting member 36.

The rear wheel 13 is supported at a rear end of the swing arm 17 through an axle 41.

The internal combustion engine 31 has a rear portion provided integrally with a transmission 43. A chain 47 is laid along a drive sprocket 44 and a driven sprocket 46, the drive sprocket 44 being fitted around an output shaft 43a of the transmission 43, the driven sprocket 46 being provided integrally with the rear wheel 13.

A radiator 48 configuring a cooling system for the internal combustion engine 31 is arranged ahead of the internal combustion engine 31. A rider step 52 is attached to the pivot supporting member 36 through a bracket 51. A pillion passenger step 54 is attached to a lower portion of the seat frame 24 through a bracket 53.

Figure 2:
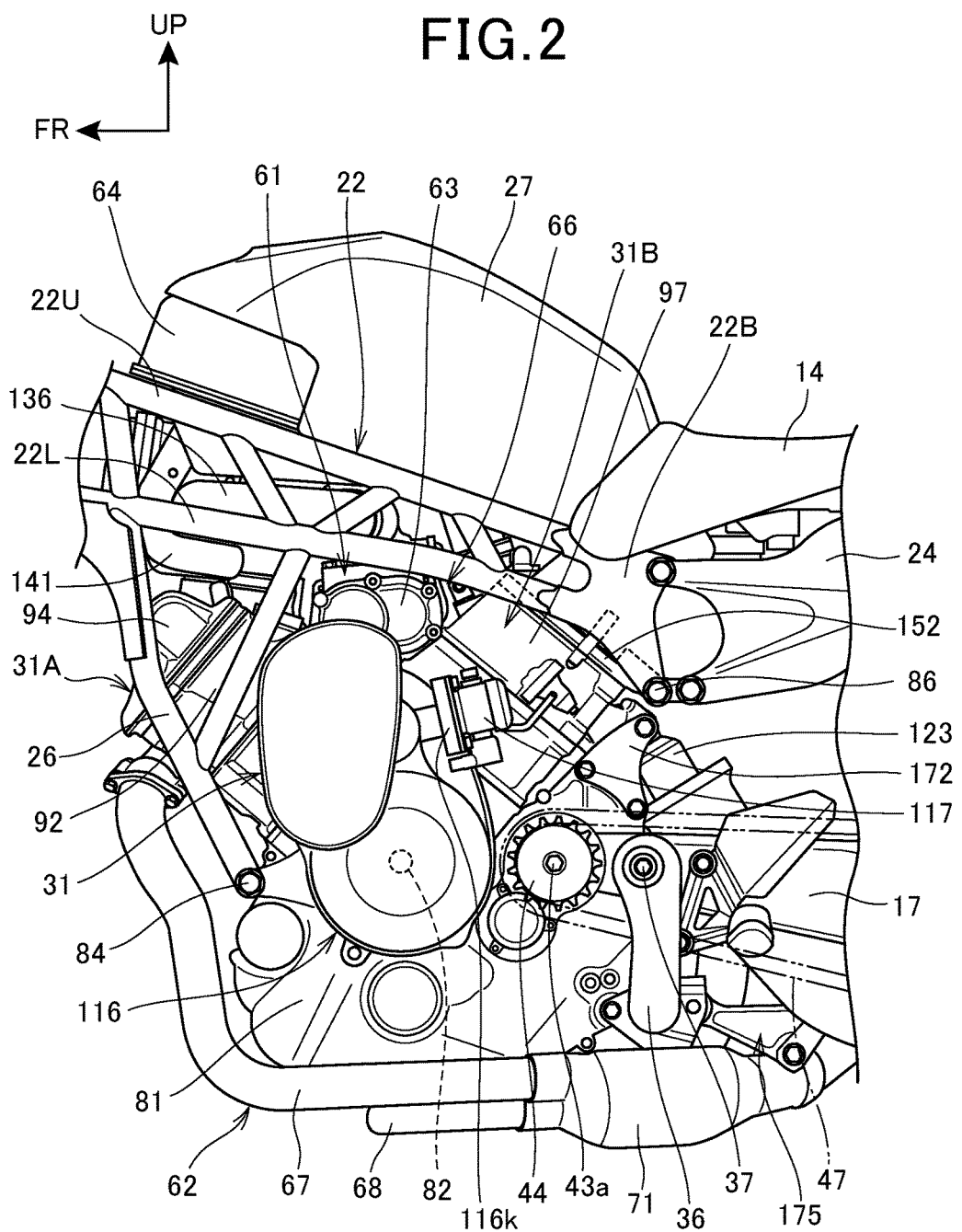
FIG. 2 is a left side view of a main section showing the motorcycle.

FIG. 2 is a left side view of a main section showing the motorcycle 10.

The internal combustion engine 31 is a V-type internal combustion engine including a front bank 31A and a rear bank 31B, and the internal combustion engine 31 is configured as a direct injection internal combustion engine directly injecting fuel into combustion chambers respectively provided to the front bank 31A and the rear bank 31B. The front bank 31A and the rear bank 31B extend obliquely forward and obliquely rearward in a V-shaped manner from an upper portion of the crankcase 81 provided to a lower portion of the internal combustion engine 31.

An intake device 61 is connected to a rear surface of the front bank 31A and a front surface of the rear bank 31B. An exhaust system 62 is connected to a front portion of the front bank 31A and a rear portion of the rear bank 31B.

The intake device 61 includes a supercharger 63 and an air cleaner 64, the supercharger 63 being driven by power from a crankshaft 82 stored in the crankcase 81 of the internal combustion engine 31, the air cleaner 64 being arranged upstream of the supercharger 63.

The supercharger 63 is arranged in a space 66 formed between the rear surface of the front bank 31A and the front surface of the rear bank 31B. The air cleaner 64 is attached to the main frames 22 in order to be positioned between the front portions of the main frames 22 and the front portion of the fuel tank 27. In the embodiment, a part of the air cleaner 64 is exposed to the front side of the vehicle and to the lateral side of the vehicle; however, the air cleaner 64 may be stored inside of the cover (unillustrated) included in the vehicle body and the air cleaner 64 also may be covered with the cover.

The crankcase 81 has a lateral portion attached with a case cover 116, and a power transmission portion 83 (see FIG. 4) for transmitting power from the crankshaft 82 to the supercharger 63 is covered with the case cover 116 from the lateral side.

The internal combustion engine 31 is attached in such a manner that a front portion of the crankcase 81 is attached to lower ends of the right and left down frames 26 by respective bolts 84, and an upper portion of the rear bank 31B is fastened from the outside in the vehicle width direction to lower ends of the rear end frame portions 22B of the main frames 22 by bolts 86.

The exhaust system 62 is provided with a front exhaust pipe 67, a rear exhaust pipe 68 (see FIG. 3), and a catalytic device 71 as a collecting portion, the front exhaust pipe 67 extending downward and rearward from the front bank 31A, the rear exhaust pipe 68 extending rearward and downward from the rear bank 31B, the catalytic device 71 being connected to respective rear ends of the front exhaust pipe 67 and the rear exhaust pipe 68.

A rear end of the catalytic device 71 is connected with an exhaust pipe configuring the exhaust system 62, and a rear end of the exhaust pipe is connected with a muffler configuring the exhaust system 62.

Figure 3:
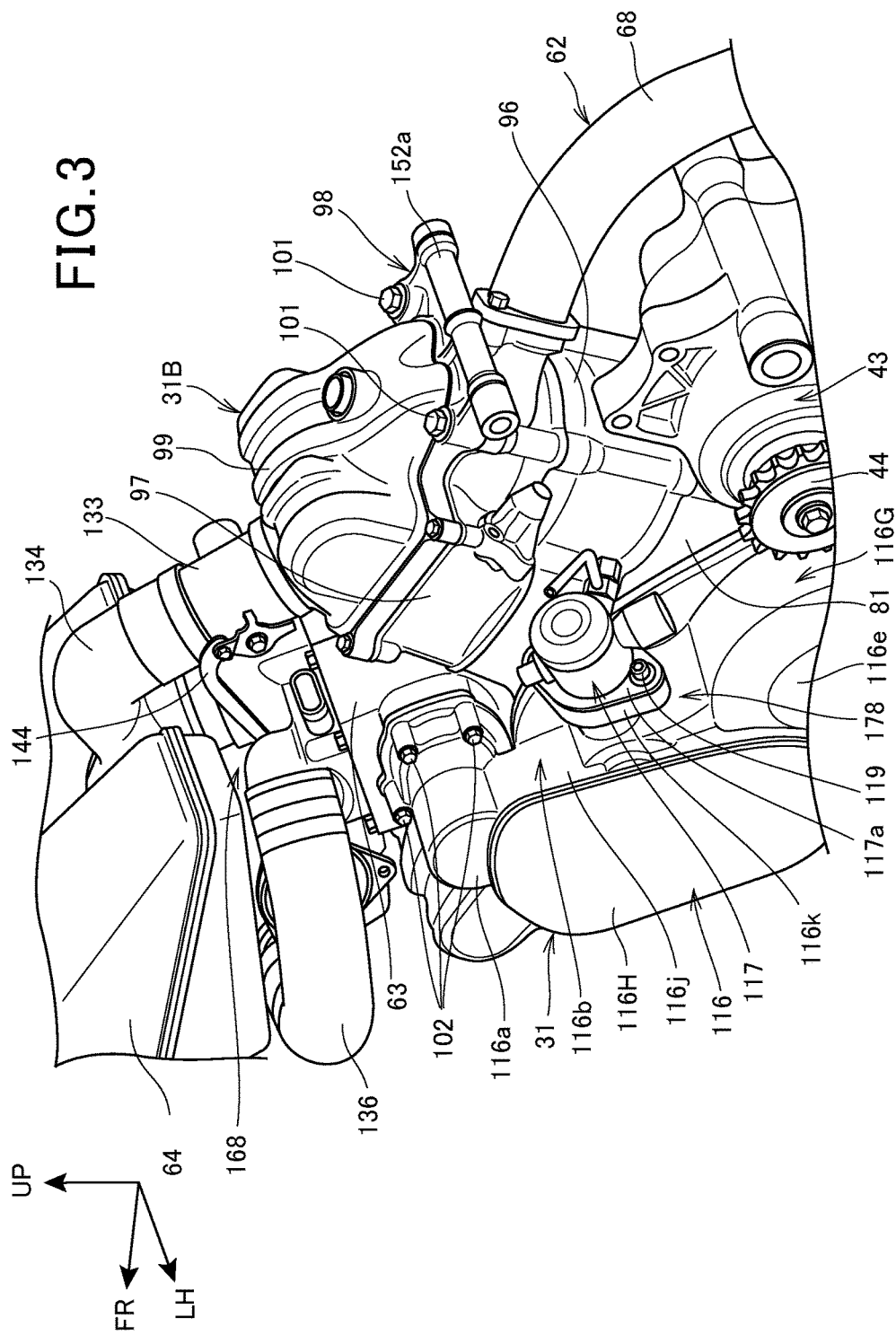
FIG. 3 is a perspective view showing the internal combustion engine and a periphery thereof.

FIG. 3 is a perspective view showing the internal combustion engine 31 and a periphery thereof, and a view when the internal combustion engine 31 is viewed from an obliquely rear side.

The internal combustion engine 31 has the rear bank 31B including a rear cylinder block 96, a rear cylinder head 97, a holder member 98, and a rear head cover 99. The rear cylinder block 96, the rear cylinder head 97, the holder member 98, and the rear head cover 99 are mounted on a rear upper portion of the crankcase 81 in order to sequentially overlap with each other.

The rear cylinder block 96, the rear cylinder head 97, and the holder member 98 are fastened to the crankcase 81 by a plurality of bolts 101. The rear head cover 99 is fixed to the rear cylinder head 97 or the holder member 98 by unillustrated separate bolts from the bolts 101.

The rear portion of the rear cylinder head 97 is connected with the rear exhaust pipe 68. The holder member 98 is arranged between the rear cylinder head 97 and the rear head cover 99. A rear end of the holder member 98 is provided with an internal combustion engine supporting portion 152a supported by the rear end frame portions 22B (see FIG. 2) of the main frames 22 (see FIG. 2).

A left portion of the supercharger 63 is attached to a supercharger supporting portion 116a by a plurality of bolts 102, the supercharger supporting portion 116a being formed integrally with an upper portion of the case cover 116.

Figure 4:
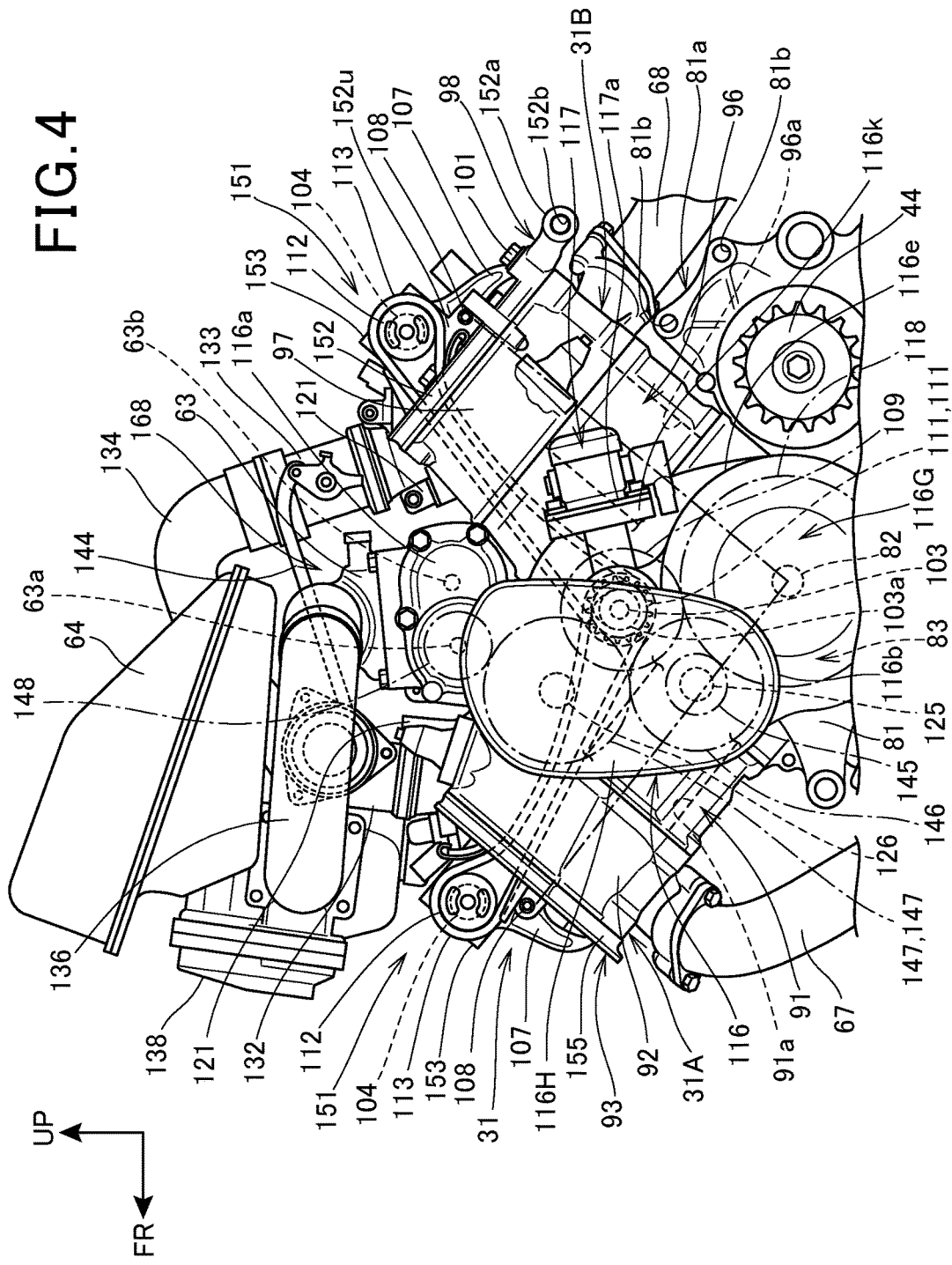
FIG. 4 is a left side view of a main section showing the internal combustion engine.

FIG. 4 is a left side view of a main section showing the internal combustion engine 31.

The internal combustion engine 31 has the front bank 31A including a front cylinder block 91, a front cylinder head 92, a spacer member 93, and a front head cover 94 (see FIG. 2). The front cylinder block 91, the front cylinder head 92, the spacer member 93, and the front head cover 94 are mounted on a front upper portion of the crankcase 81 in order to sequentially overlap with each other. Tubular cylinders 91a, 96a are provided inside of the front cylinder block 91 and the rear cylinder block 96 respectively. Pistons are movably fitted into the cylinders 91a, 96a.

A drive shaft 103 arranged above the crankshaft 82 is rotatably supported by the crankcase 81. The drive shaft 103 is arranged in parallel with the crankshaft 82, the drive shaft 103 is formed integrally with a cam lobe 103a provided with a cam crest, and the drive shaft 103 is also attached with a driven gear 109.

The spacer member 93 is arranged between the front cylinder head 92 and the front head cover 94. The camshaft 104 arranged in parallel with the crankshaft 82 is rotatably supported by the spacer member 93. Also, the spacer member 93 is attached with a rocker arm shaft 108 for supporting an exhaust rocker arm 107.

The exhaust rocker arm 107 is driven by an exhaust cam (not shown) provided to the camshaft 104. Also, the exhaust rocker arm 107 drives an exhaust engine valve opening/closing exhaust ports opened in the combustion chambers formed between the front cylinder block 91 and the front cylinder head 92.

Also, the camshaft 104 is provided with an intake cam (not shown), and the intake cam directly drives the intake engine valve opening/closing the intake ports opened in the combustion chambers.

A pair of drive sprockets 111, 111 is attached to the drive shaft 103. A cam sprocket 112 is attached to the camshaft 104. A cam chain 113 is laid between one of the drive sprockets 111, 111 and the cam sprocket 112.

The camshaft 104 arranged in parallel with the crankshaft 82 is rotatably supported by the holder member 98. Also, in the same way as the spacer member 93, the rocker arm shaft 108 supporting the exhaust rocker arm 107 is attached to the holder member 98.

The exhaust rocker arm 107 is driven by the exhaust cam provided to the camshaft 104. Also, the exhaust rocker arm 107 drives the exhaust engine valves opening/closing the exhaust ports opened in the combustion chambers formed between the rear cylinder block 96 and the rear cylinder head 97.

In the same way as the front bank 31A, the cam sprocket 112 is attached to the camshaft 104, and the cam chain 113 is laid between the other of the drive sprockets 111, 111 attached to the drive shaft 103 and the cam sprocket 112.

The case cover 116 is attached to one surface (left surface) of the crankcase 81.

The crankshaft 82 is attached with a drive gear 118, and a driven gear 109 of the drive shaft 103 is engaged with the drive gear 118. Then, power of the crankshaft 82 is transmitted to the drive shaft 103.

A pair of intermediate shafts 125, 126 is rotatably supported by the crankcase 81, the pair of intermediate shafts 125, 126 being arranged in parallel with the crankshaft 82 and also being arranged in front of the crankshaft 82 and the drive shaft 103. The intermediate shafts 125, 126 are juxtaposed in a vertical direction. The intermediate shaft 125 is attached with a first intermediate gear 145 and a second intermediate gear 146, the first intermediate gear 145 being engaged with the drive gear 118 of the crankshaft 82. The intermediate shaft 126 is attached with a pair of intermediate gears 147, and one of the pair of intermediate gears 147 is engage with the second intermediate gear 146.

The supercharger 63 is provided with a pair of rotor shafts 63a, 63b arranged in parallel with each other, and rotors are respectively attached to the rotor shafts 63a, 63b. One rotor shaft 63a is attached with a rotor shaft gear 148. The rotor shaft gear 148 is engaged with the other of the pair of intermediate gears 147 of the intermediate shaft 126.

The above-described drive gear 118, the above-described intermediate shafts 125, 126, the above-described first intermediate gear 145, the above-described second intermediate gear 146 and the above-described pair of intermediate gears 147 configure the power transmission portion 83 transmitting the power from the crankshaft 82 to the supercharger 63.

One shaft end of the crankshaft 82, the drive shaft 103, the driven gear 109, the drive sprockets 111, 111, the power transmission portion 83, and the supercharger 63 are covered with the case cover 116 from the lateral side of the vehicle body.

The case cover 116 is configured with an integrally molded case cover body 116G and a lid 116H detachably attached to a side edge portion of the case cover body 116G.

The case cover body 116G is provided with a supercharger supporting portion 116a, a gear storage portion 116b, and a crankcase cover portion 116e.

The supercharger supporting portion 116a covers a lateral side of the supercharger 63. The gear storage portion 116b stores the first intermediate gear 145, the second intermediate gear 146, the pair of intermediate gears 147, a lower portion of the rotor shaft gear 148, and also covers the lateral sides of the crankcase 81 and the front bank 31A. The crankcase cover portion 116e covers the lateral side of the crankcase 81 around the crankshaft 82, the drive gear 118 and the like.

A high-pressure fuel pump 117 activated by using power of the drive shaft 103 (that is, power of the crankshaft 82) is supported by the rear portion of the case cover 116.

The high-pressure fuel pump 117 is driven by the cam lobe 103a (a substantially oval-shaped cross-sectional portion having a cam crest) provided to the drive shaft 103. Fuel pressurized by the high-pressure fuel pump 117 is injected to the combustion chambers through fuel injection valves 121 respectively provided to the front cylinder head 92 and the rear cylinder head 97.

In FIG. 3 and FIG. 4, the case cover 116 has a rear wall 116j of the gear storage portion 116b, the rear wall 116j being formed integrally with a pump pedestal portion 116k. A platelike flange portion 117a provided to the high-pressure fuel pump 117 is fastened to the pump pedestal portion 116k by a pair of bolts 119. Thereby, the high-pressure fuel pump 117 is fixed to the case cover 116.

The rear upper portion of the crankcase 81 behind the rear bank 31B is formed with an upwardly protruding cushion upper end supporting portion 81a, the cushion upper end supporting portion 81a supporting the upper end of the cushion unit 123 (see FIG. 1). Mounting holes 81b, 81b are respectively opened in the cushion upper end supporting portion 81a in a longitudinal direction.

Figure 5:
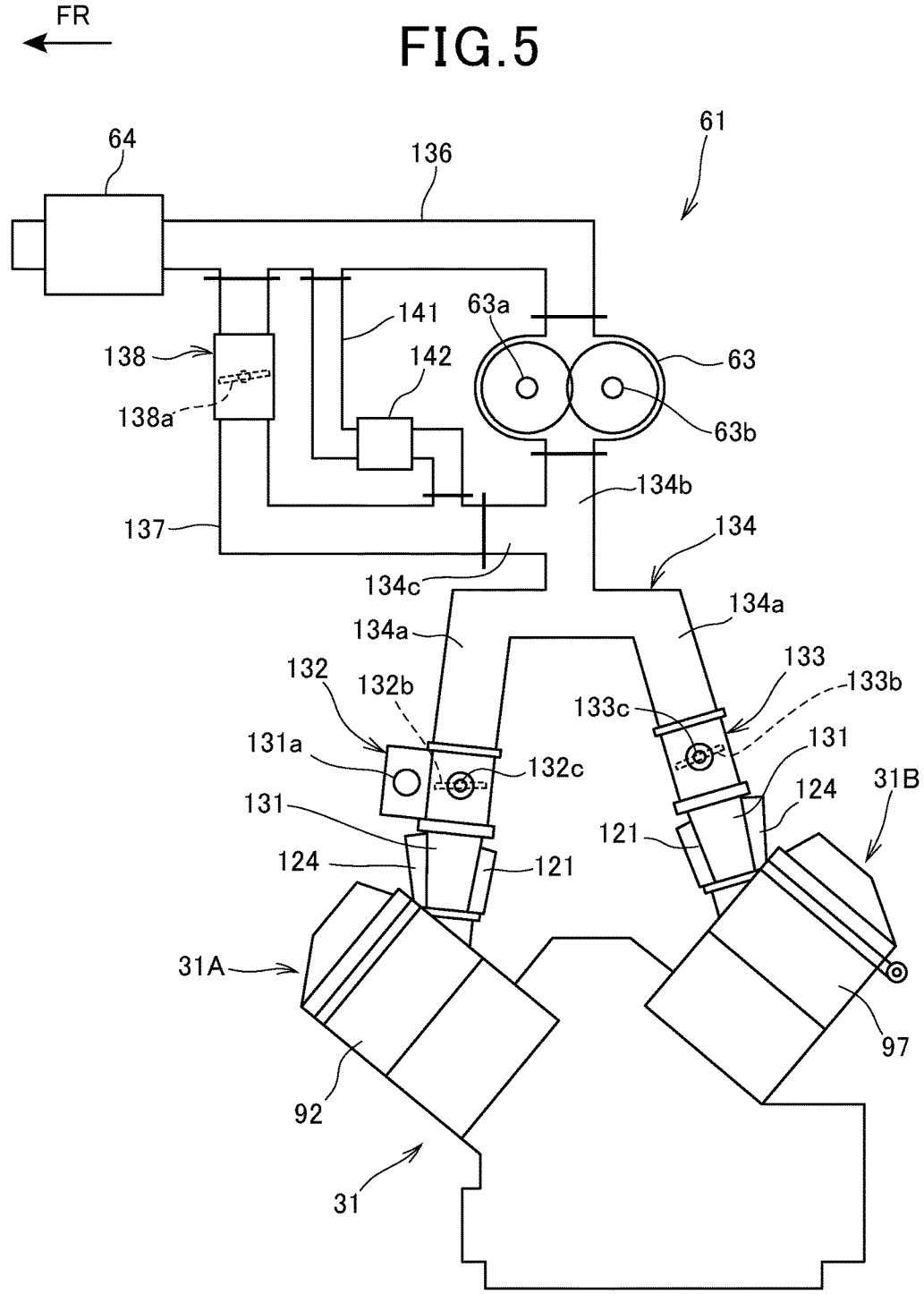
FIG. 5 is a pattern diagram showing an intake device connected to the internal combustion engine.

FIG. 5 is a pattern diagram showing an intake device 61 connected to the internal combustion engine 31.

The intake device 61 is provided with intake pipes 131, 131, the TBW throttle device 132, a throttle device 133, fuel injection valves 121, 121, 124, 124, a downstream connecting tube 134, the supercharger 63, an upstream connecting tube 136, the air cleaner 64, a bypass pipe 137, a bypass valve device 138, a relief pipe 141, and a relief valve 142.

The front cylinder head 92 is provided with the intake pipe 131, and the TBW throttle device 132 is connected to the intake pipe 131. The TBW throttle device 132 is provided with an electric motor 132a, and a throttle valve 132b driven by the electric motor 132a, and the TBW throttle device 132 is a component configuring a TBW described below.

The TBW (Throttle-by-Wire) is a system configured in such a manner that turning movement of a throttle grip provided to the handlebar 33 (see FIG. 1) is detected by a sensor, a sensing signal is transmitted to the electric motor 132a through a conductor, and the throttle valve 132b is opened/closed by the electric motor 132a.

In addition to the fuel injection valve 121 for direct injection, the fuel injection valve 124 for injecting fuel into the intake pipe 131 is attached to the intake pipe 131 of the front bank 31A.

The rear cylinder head 97 is provided with the intake pipe 131, and the throttle device 133 is connected to the intake pipe 131. The throttle device 133 is provided with a throttle valve 133b opened/closed in conjunction with the throttle valve 132b of the TBW throttle device 132. The throttle valve 132b and the throttle valve 133b are coupled to each other through a rod 144 (see FIG. 3 and FIG. 4).

In addition to the fuel injection valve 121 for direct injection, the fuel injection valve 124 for injecting the fuel into the intake pipe 131 is attached to the intake pipe 131 of the rear bank 31B.

Forked pipe portions 134a, 134a of the downstream connecting tube 134 are connected to the TBW throttle device 132 and the throttle device 133. Also, one end of the supercharger 63 is connected to a pipe portion 134b extending from the collecting portion of the pipe portions 134a, 134a of the downstream connecting tube 134.

The air cleaner 64 is connected to the other end of the supercharger 63 through the upstream connecting tube 136.

The supercharger 63 is a mechanical type (supercharger), and has an inner side provide with the two rotor shafts 63a, 63b (see FIG. 4), and rotors respectively provided to the respective rotor shafts 63a, 63b. The supercharger 63 is configured in such a manner that the power is transmitted to one rotor shaft 63a, the rotors engaged with each other are rotated, and compressed air is delivered. Air supplied from the air cleaner 64 to the supercharger 63 through the upstream connecting tube 136 is compressed by the supercharger 63, and the air is delivered from the supercharger 63 to the downstream connecting tube 134. After that, the air is led to the combustion chambers through the downstream connecting tube 134, the TBW throttle device 132, the throttle device 133, the intake pipes 131, 131, and intake ports formed in the front cylinder head 92 and the rear cylinder head 97.

The downstream connecting tube 134 is formed with a pipe portion 134c extending from the pipe portion 134b to the lateral side. The pipe portion 134c and the upstream connecting tube 136 are connected with the bypass pipe 137, and the bypass valve device 138 is provided in the middle of the bypass pipe 137.

The bypass valve device 138 is a device provided with a bypass valve 138a, and the bypass valve device 138 adjusts supercharging pressure of an output side of the supercharger 63 (a range from the downstream connecting tube 134 to the combustion chambers) by changing an opening of the bypass valve 138a.

Also, the relief pipe 141 is connected to the upstream connecting tube 136 and a side of the bypass pipe 137, the side being positioned closer to the pipe portion 134c than the bypass valve device 138. The relief valve 142 is provided in the middle of the relief pipe 141.

When the supercharging pressure on the output side of the supercharger 63 exceeds a predetermined value, the relief valve 142 releases the pressure from the output side of the supercharger 63 to the input side thereof.

Figure 6:
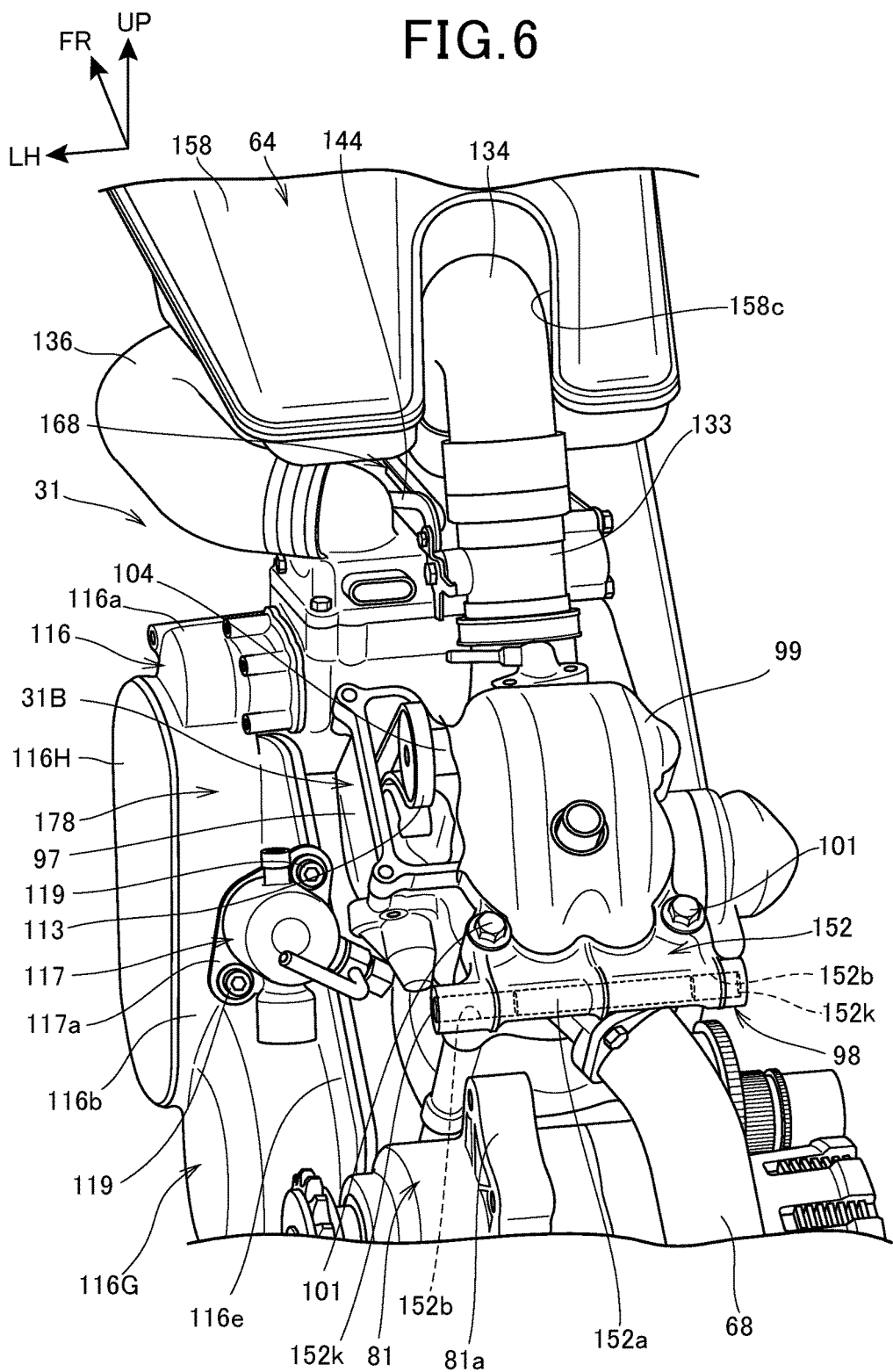
FIG. 6 is a perspective view showing a rear bank of the internal combustion engine and a periphery of the rear bank.

FIG. 6 is a perspective view showing the rear bank 31B of the internal combustion engine 31 and a periphery of the rear bank 31B, and FIG. 6 is a view when viewed from an obliquely rear side.

The rear cylinder head 97 is provided with a valve train 151 (see FIG. 4) opening/closing a pair of intake engine valves and a pair of exhaust engine valves.

The valve train 151 is provided with the camshaft 104, a pair of exhaust rocker arms 107, 107, and the rocker arm shaft 108 (see FIG. 4).

The camshaft 104 is rotatably supported by the holder member 98.

The holder member 98 is configured with an integrally molded holder body 152, and a cap member 153 (see FIG. 4) as an integrally molded article attached to the holder body 152 by a plurality of bolts. Each of the holder body 152 and the cap member 153 is a workpiece with aluminum alloy casting machined.

The camshaft 104 is supported by being sandwiched between the holder body 152 and the cap member 153.

The exhaust rocker arms 107, 107 extend in the longitudinal direction in order to be perpendicular to the camshaft 104, the exhaust rocker arms 107, 107 are rockably supported by the rocker arm shaft 108 (see FIG. 4), and the exhaust rocker arms 107, 107 are driven by a pair of exhaust cams formed with respect to the camshaft 104.

In the camshaft 104, the intake cam is formed between the pair of exhaust cams, and the pair of intake engine valves is directly driven by the intake cam.

The rocker arm shaft 108 is attached to the holder body 152 in order to be arranged in parallel with the camshaft 104.

The internal combustion engine supporting portion 152a is integrally provided at the rear end of the holder body 152, and female screws 152b, 152b are formed at ends 152k, 152k on both sides of the internal combustion engine supporting portion 152a, the female screws 152b, 152b being screwed around and coupled to the bolts 86 (see FIG. 2), the bolts 86 being coupled to the right and left main frames 22 (see FIG. 2).

In FIG. 4, the above-described valve train 151 is provided also to the front cylinder head 92. Note that the camshaft 104 is rotatably supported by the spacer member 93. The spacer member 93 is configured with a spacer body 155, and a cap member 153 attached to the spacer body 155 by a plurality of bolts. The camshaft 104 is supported by being sandwiched between the spacer body 155 and the cap member 153. The rocker arm shaft 108 is attached to the spacer body 155 in order to be arranged in parallel with the camshaft 104. The spacer body 155 is a workpiece with the aluminum alloy casting machined.

In FIG. 6, the rod 144 having a rear end coupled to the throttle device 133 is arranged inside of the upstream connecting tube 136 in the vehicle width direction, the upstream connecting tube 136 being connected to an inlet side of the supercharger 63. The rod 144 is arranged in a space 168 in order to extend in the longitudinal direction, the space 168 being formed inside of the upstream connecting tube 136 in the vehicle width direction and below the air cleaner 64 (detailedly, the air cleaner case 158 configuring the air cleaner 64).

The high-pressure fuel pump 117 is arranged outside of the crankcase cover portion 116e in the vehicle width direction, and the high-pressure fuel pump 117 is also attached to the rear portion of the gear storage portion 116b. Also, the high-pressure fuel pump 117 is arranged in a space 178 arranged outside of the crankcase cover portion 116e in the vehicle width direction, and the high-pressure fuel pump 117 is arranged rearward of the gear storage portion 116b. With this arrangement, even if there is an interference object with respect to the case cover 116 from the lateral side of the vehicle, the high-pressure fuel pump 117 can be protected by the gear storage portion 116b protruding outward in the vehicle width direction in comparison with the high-pressure fuel pump 117. Also, the space 178 can be effectively used by arranging the high-pressure fuel pump 117 in the space 178.

Figure 7:
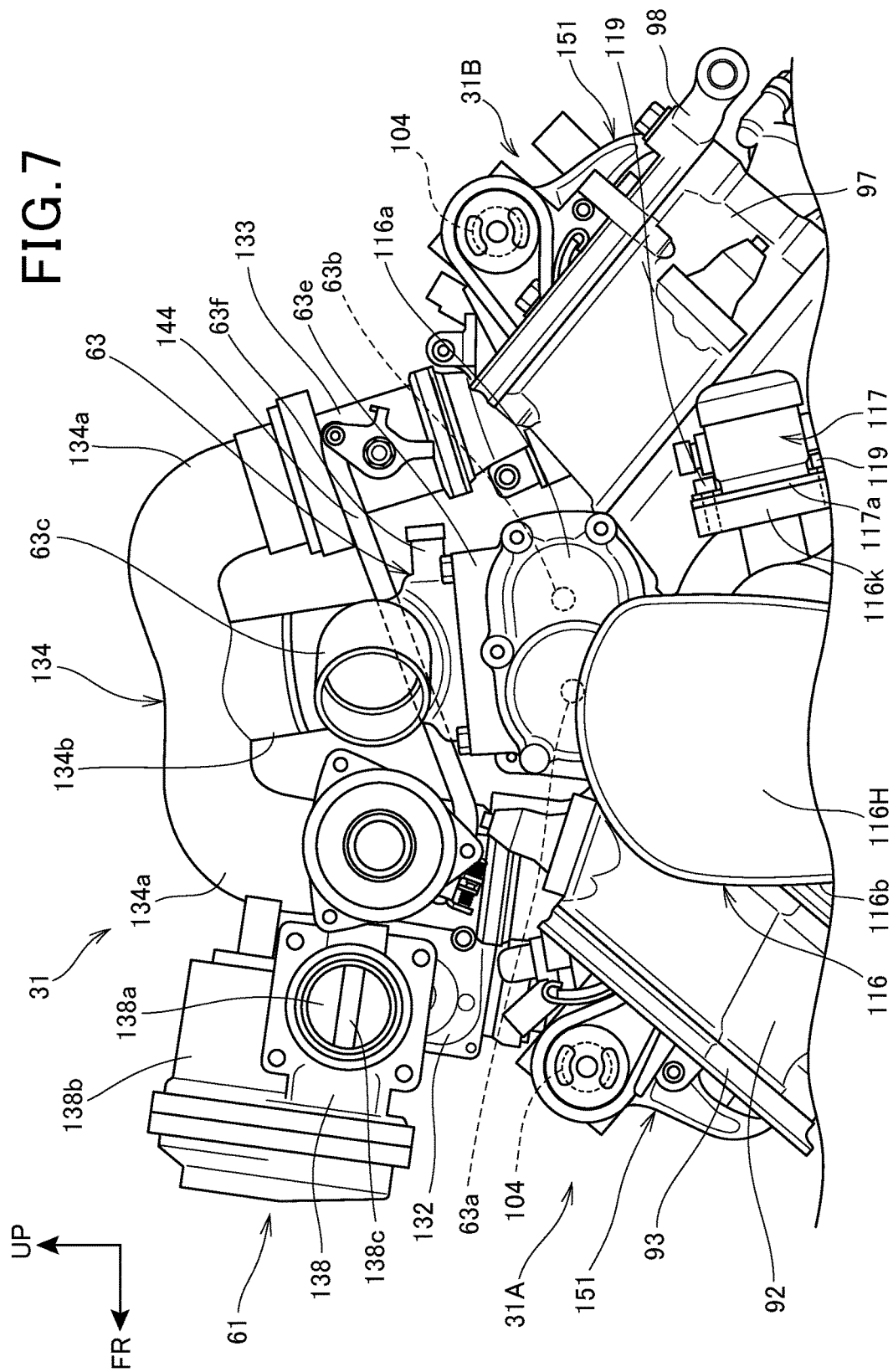
FIG. 7 is a left side view showing an upper portion of the internal combustion engine.

FIG. 7 is a left side view showing an upper portion of the internal combustion engine 31.

The upstream connecting tube 136 (see FIG. 5) and the relief pipe 141 (see FIG. 5) are removed from the intake device 61.

The supercharger 63 is provided with a supercharger body 63e and a pipe portion connection 63f, the supercharger body 63e storing the rotor shafts 63a, 63b and the rotors respectively attached to the rotor shafts 63a, 63b, the pipe portion connection 63f being attached to an upper portion of the supercharger body 63e by a plurality of bolts. The pipe portion connection 63f has an upper left side formed with an inlet pipe portion 63c connected with the downstream connecting tube 134 (see FIG. 6). The inlet pipe portion 63c is formed to extend obliquely forward with respect to the outer side in the vehicle width direction.

The downstream connecting tube 134 has the pipe portions 134a, 134a provided at both ends, the pipe portions 134a, 134a being respectively connected to respective upper ends of the TBW throttle device 132 and the throttle device 133. Also, the downwardly protruding pipe portion 134b provided between the pipe portions 134a, 134a is connected to the upper right side of the supercharger 63.

The bypass valve device 138 is arranged on the left side of the TBW throttle device 132 in the vehicle width direction. That is, the TBW throttle device 132 and the bypass valve device 138 are arranged to overlap with each other in the vehicle width direction.

The bypass valve device 138 is provide with a valve shaft 138c and an electric motor 138b, the valve shaft 138c being attached with the bypass valve 138a, the electric motor 138b adjusting an opening of the bypass valve 138a to an optional angle. The electric motor 138b opens/closes the bypass valve 138a through the valve shaft 138c.

Figure 8:
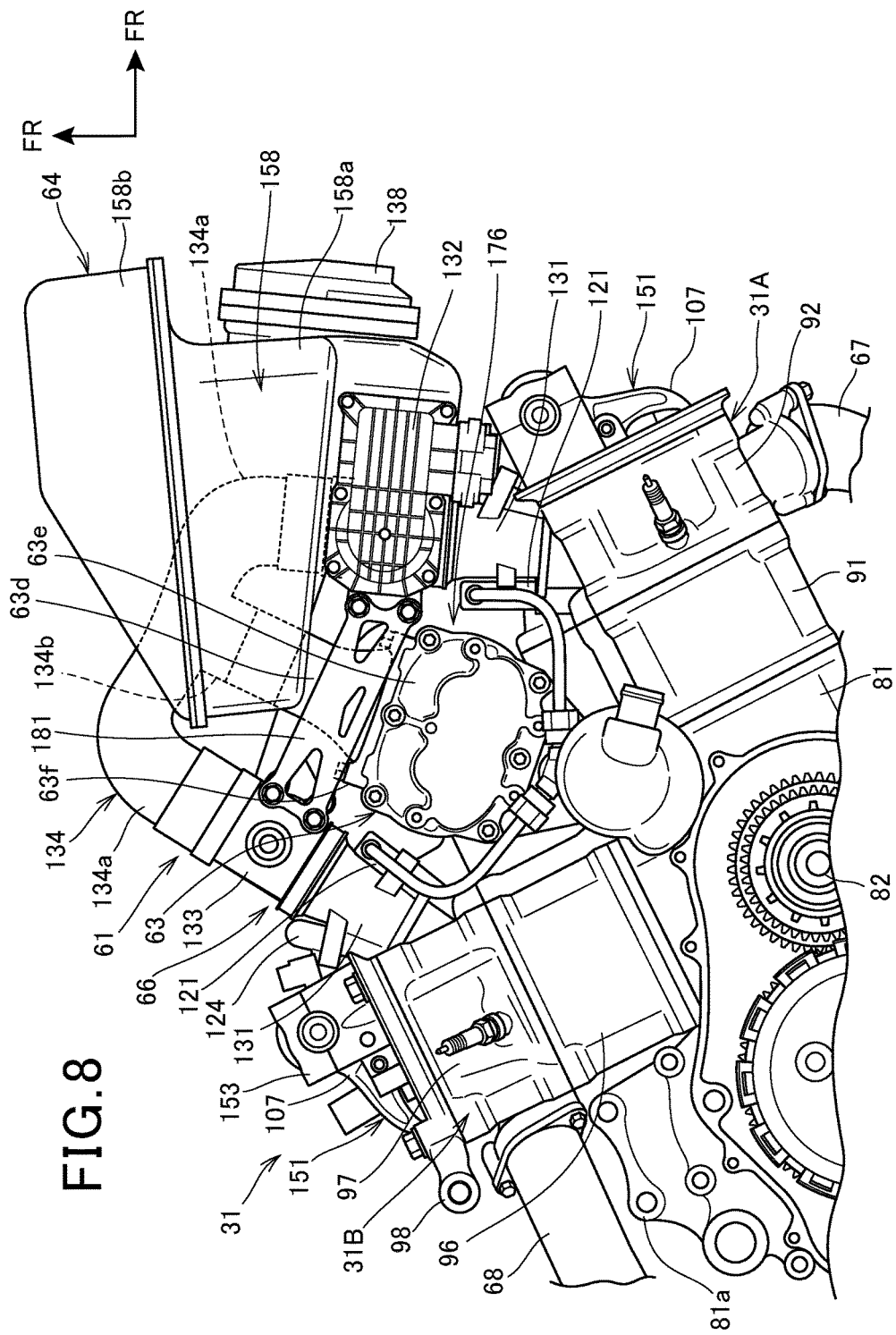
FIG. 8 is a right side view showing the upper portion of the internal combustion engine.

FIG. 8 is a right side view showing the upper portion of the internal combustion engine 31.

The TBW throttle device 132 and the throttle device 133 are coupled to each other through a coupling plate 181 extending downward to the front side. An outlet pipe portion 63d formed with respect to the pipe portion connection 63f of the supercharger 63 is arranged inside of the coupling plate 181 in the vehicle width direction. The outlet pipe portion 63d is connected to the pipe portion 134b (see FIG. 7) of the downstream connecting tube 134.

The air cleaner 64 is provided with the air cleaner case 158, and an air cleaner element arranged inside of the air cleaner case 158. The air cleaner case 158 is configured with an air clear case body 158a, and an air cleaner case cover 158b for covering an upper opening of the air cleaner case body 158a. The upstream connecting tube 136 (see FIG. 5) is connected to the air cleaner case body 158a.

The air cleaner case 158 has a front end positioned above the bypass valve device 138, and the air cleaner case 158 has a rear end positioned above the supercharger 63. Also, as shown in FIG. 6, the rear portion of the air cleaner case 158 (that is, the air cleaner case body 158a and the air cleaner case cover 158b) is formed with a notch portion 158c, the notch portion 158c being provided for passage of the downstream connecting tube 134 and the notch portion 158c being opened toward the rear side.

In FIG. 8, the supercharger 63 is arranged in a space 176, the space 176 being arranged in the space 66, the space 176 being arranged between the intake pipe 131 of the front bank 31A/the TBW throttle device 132 and the intake pipe 131 of the rear bank 31B/the throttle device 133. Also, the supercharger 63 is arranged below the air cleaner case 158.

Figure 9:
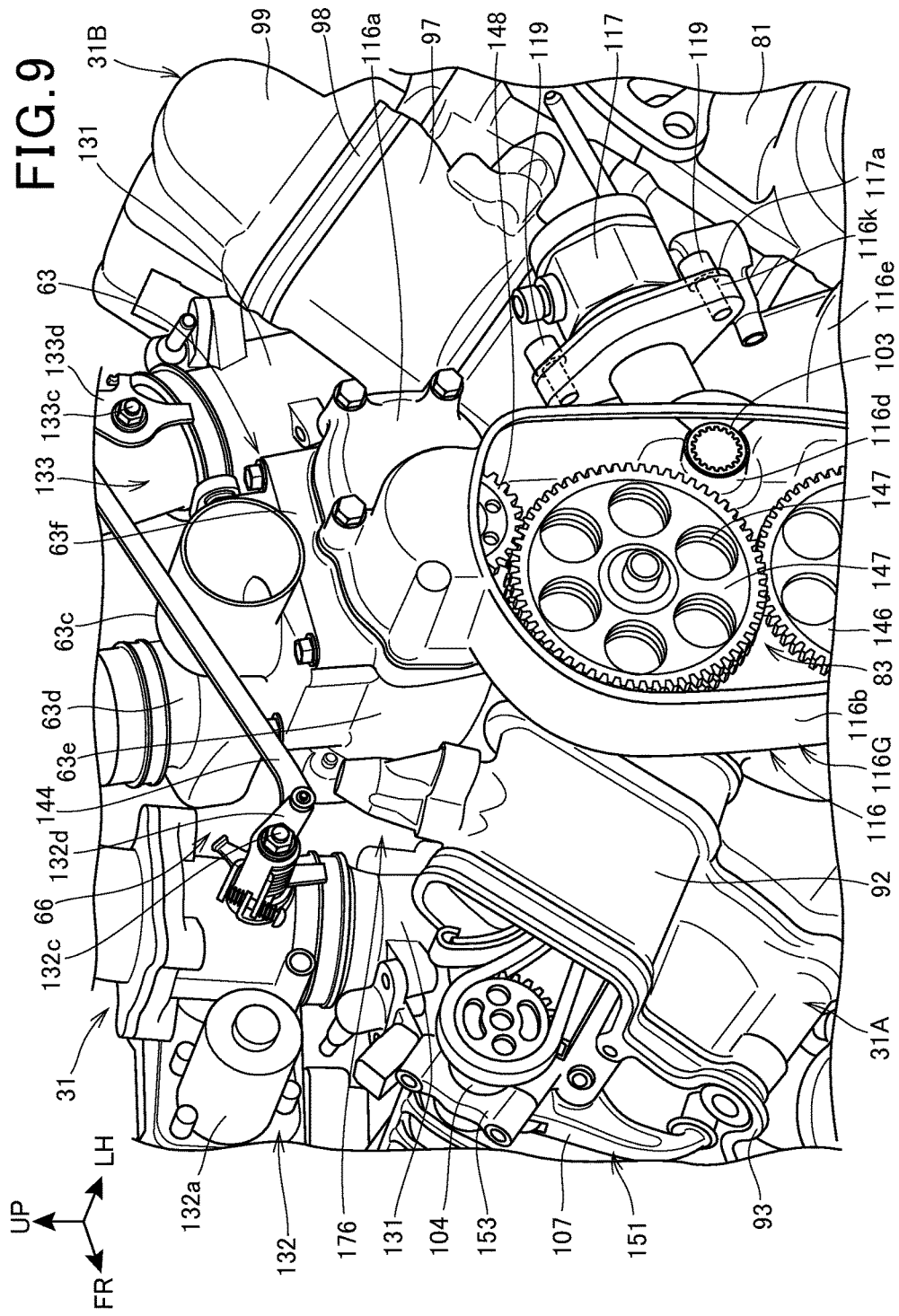
FIG. 9 is a perspective view showing the upper portion of the internal combustion engine.
Figure 10:
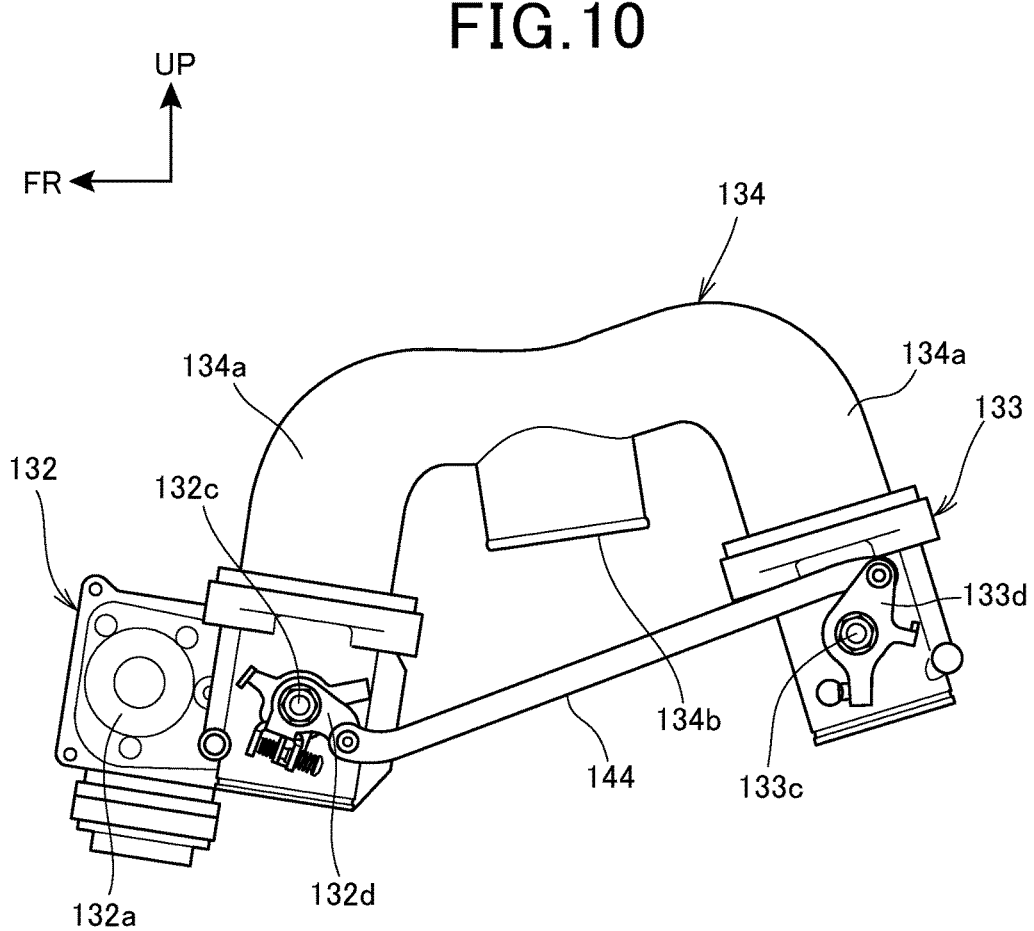
FIG. 10 is a left side view showing a TBW throttle device, a throttle device, and peripheries thereof.

FIG. 9 is a perspective view showing the upper portion of the internal combustion engine 31, and FIG. 9 is a view when viewed from an obliquely upper side. FIG. 10 is a left side view showing the TBW throttle device 132, the throttle device 133, and a periphery of the throttle device 133.

As shown in FIG. 9, the inlet pipe portion 63c (see FIG. 7) and the outlet pipe portion 63d of the supercharger 63 are arranged in the space 176 in the space 66 above the internal combustion engine 31 in order to overlap with each other in the vehicle width direction. The rod 144 is arranged to extend in the longitudinal direction between the inlet pipe portion 63c and the outlet pipe portion 63d.

In the case cover 116, the vertically long gear storage portion 116b is integrally provided below the supercharger supporting portion 116a. The gear storage portion 116b has a lateral end provided with the attachable/detachable lid 116H (see FIG. 3). The first intermediate gear 145 (see FIG. 4), the second intermediate gear 146, the pair of intermediate gears 147, 147, and the lower portion of the rotor shaft gear 148 are stored in the gear storage portion 116b. In this way, in the case cover 116, since the gear storage portion 116b is provided together with the supercharger supporting portion 116a, the present invention has a combination of a supporting structure and a storing structure in addition to a covering structure as the original function for covering the crankcase 81 from the lateral side. For this reason, the number of components can be reduced in comparison with the case that the respective structures are individually provided, and costs and assembling man-hours can be reduced. As a result, the assemblability and the productivity of the internal combustion engine 31 can be improved.

The rear inner surface of the gear storage portion 116b is formed integrally with a raised portion 116d protruding outward in the vehicle width direction. The drive shaft 103 is rotatably fitted into the raised portion 116d.

The supercharger 63 is supported by the supercharger supporting portion 116a in order to protrude from the supercharger supporting portion 116a of the case cover 116 to the right side in the vehicle width direction. For this reason, the supercharger 63 can be assembled to the internal combustion engine 31 in order to be inserted from the left side of the internal combustion engine 31 in the vehicle width direction into the space 66 between the front bank 31A and the rear bank 31B. As a result, the assemblability of the internal combustion engine 31 can be improved, the productivity can be improved, and also the limited space 66 in the motorcycle 10 (see FIG. 1) can be effectively used.

As shown in FIG. 10, the TBW throttle device 132 is provided with a body 132e, a throttle shaft 132c, the throttle valve 132b (see FIG. 5), a throttle arm 132d, and the electric motor 132a.

The body 132e is formed with an air passage for allowing air to pass therethrough. The throttle shaft 132c is rotatably supported by the body 132e, and the throttle shaft 132c is also passed through the air passage formed in the body 132e. The throttle valve 132b is attached to the throttle shaft 132c, and the throttle valve 132b also opens/closes the air passage formed in the body 132e. The throttle arm 132d is attached to an end of the throttle shaft 132c, and a front end of the rod 144 is coupled to the throttle arm 132d. The electric motor 132a rotates the throttle shaft 132c in order to open/close the throttle valve 132b to the optional opening.

The throttle device 133 is provided with a body 133e, a throttle shaft 133c, the throttle valve 133b (see FIG. 5), and a throttle arm 133d.

The body 133e is formed with an air passage for allowing air to flow therethrough. The throttle shaft 133c is rotatably supported by the body 133e, and the throttle shaft 133c is also passed through the air passage formed in the body 133e. The throttle valve 133b is attached to the throttle shaft 133c, and the throttle valve 133b also opens/closes the air passage formed in the body 132e. The throttle arm 133d is attached to an end of the throttle shaft 133c, and a rear end of the rod 144 is coupled to the throttle arm 133d.

As shown in above FIG. 3 and FIG. 4, the internal combustion engine 31 with the supercharger 63 for the motorcycle 10 as the saddle-ride type vehicle includes the supercharger 63 arranged above the crankcase 81 positioned below the front cylinder head 92 and the rear cylinder head 97 as the cylinder heads. In the internal combustion engine 31 with the supercharger 63 for the motorcycle 10, the crankcase 81 is covered with the case cover 116 from the outside in the vehicle width direction, and the supercharger 63 is supported by the case cover 116 (detailedly, the supercharger supporting portion 116a).

With this structure, in the motorcycle 10 (see FIG. 1) having the limited space in comparison with the automobile, since the supercharger 63 is supported by the case cover 116 from the outside in the vehicle width direction, the case cover 116 can be assembled to the crankcase 81 from the outside in the vehicle width direction with the supercharger 63 arranged in a sub-assembling manner. In this way, the supercharger 63 can be easily assembled to the crankcase 81 through the case cover 116, and the assemblability and the productivity of the supercharger 63 can be improved even if the auxiliary machine component or the like for the internal combustion engine 31 is arranged above the crankcase 81.

Also, as shown in FIG. 4, the supercharger 63 is transmitted with the power through the power transmission portion 83 from the crankshaft 82 stored in the crankcase 81, and the case cover 116 is the power transmission portion cover for covering the power transmission portion 83. For this reason, by covering the power transmission portion 83 with the case cover 116 for supporting the supercharger 63, the number of components can be reduced. Also, since economical layout can be achieved, the assemblability and the productivity can be improved.

Also, the internal combustion engine 31 is the direct injection internal combustion engine for directly injecting the fuel into the cylinders 91a, 96a respectively provided to the front cylinder block 91 and the rear cylinder block 96 as the cylinder blocks, and the high-pressure fuel pump 117 for fuel injection is attached to the case cover 116 and the high-pressure fuel pump 117 is also arranged to overlap with the rear cylinder block 96 in the side view. With this arrangement, the high-pressure fuel pump 117 is positioned lateral to the rear cylinder block 96. For this reason, the power can be easily transmitted from the crankshaft 82, and the structure of the internal combustion engine 31 can be further simplified.

Also, the drive shaft 103 is rotatably supported by the crankcase 81, the drive shaft 103 is formed with the cam lobe 103a for driving the high-pressure fuel pump 117, and the rotation of the crankshaft 82 is transmitted to the drive shaft 103 by engagement of the drive gear 118 provided to the crankshaft 82 with the driven gear 109 provided to the drive shaft 103. For this reason, the power can be transmitted from the crankshaft 82 to the drive shaft 103 by the simple structure, and the costs can be reduced.

Also, as shown in FIG. 4 and FIG. 7, the air cleaner case 158 is arranged above the front cylinder head 92, and the bypass valve device 138 and the TBW throttle device 132 are arranged between the air cleaner case 158 and the front cylinder head 92, the bypass valve device 138 adjusting the supercharging pressure of the supercharger 63, the TBW throttle device 132 opening/closing the throttle valve 132b by the electric motor 132a as the actuator according to the throttle signal. For this reason, by arranging the bypass valve device 138 and the TBW throttle device 132 between the air cleaner case 158 and the front cylinder head 92, the limited vehicle body space in the motorcycle 10 (see FIG. 1) can be effectively used.

Also, as shown in FIG. 4, FIG. 7 and FIG. 8, the bypass valve device 138 and the TBW throttle device 132 overlap with each other in the side view. For this reason, the limited vehicle body space in the motorcycle 10 can be effectively used.

Also, as shown in FIG. 4, the internal combustion engine 31 is the V-type internal combustion engine including the front bank 31A and the rear bank 31B, and the supercharger 63 is arranged between the front bank 31A and the rear bank 31B. For this reason, the limited vehicle body space in the motorcycle 10 can be effectively used.

Also, as shown in FIG. 6 and FIG. 7, the TBW throttle device 132 is provided to one of the front bank 31A and the rear bank 31B, and the throttle device 133 is provide to the other of the front bank 31A and the rear bank 31B. The throttle valves 132b, 133b respectively included in the TBW throttle device 132 and the throttle device 133 can be interlocked with each other by the rod 144 as the coupling member. The rod 144 is arranged inside in the vehicle width direction of the upstream connecting tube 136 as the pipe connected to the supercharger 63. For this reason, the space 168 as the vehicle body space inside in the vehicle width direction of the upstream connecting tube 136 in the motorcycle 10 can be effectively used.

Also, as shown in FIG. 4 and FIG. 6, the case cover 116 is provide with the crankcase cover portion 116e and the gear storage portion 116b, the crankcase cover portion 116e covering the lateral side of the crankcase 81, the gear storage portion 116b protruding outward of the crankcase cover portion 116e in the vehicle width direction, the gear storage portion 116b storing the first intermediate gear 145, the second intermediate gear 146, and the pair of intermediate gears 147 as the gears included in the power transmission portion 83. The high-pressure fuel pump 117 is arranged outward of the crankcase cover portion 116e in the vehicle width direction, and the high-pressure fuel pump 117 is also attached to the rear portion of the gear storage portion 116b. For this reason, by arranging the high-pressure fuel pump 117 on the inner side in the vehicle width direction in comparison with the gear storage portion 116b, the high-pressure fuel pump 117 can be protected from the interference object from the lateral side of the vehicle by the gear storage portion 116b. Also, the space 178 can be effectively used, the space 178 being the vehicle body space outside of the crankcase cover portion 116e in the vehicle width direction and behind the gear storage portion 116b.

The above-described embodiment presents absolutely one embodiment of the present invention. Various design modifications and application may be optionally made within the scope not departing from the gist of the present invention.

For example, in the above-described embodiment, as shown in FIG. 4 and FIG. 6, the case cover body 116G of the case cover 116 is formed as the integrally molded component; however, the present invention is not limited thereto. Any of or all the supercharger supporting portion 116a, the gear storage portion 116b, and the crankcase cover portion 116e of the case cover body 116G may be formed separately from each other.

Application of the present invention is not limited to the motorcycle 10. The present invention can be applied also to the saddle-ride type vehicles including the vehicles excluding the motorcycle 10. Note that the saddle-ride type vehicles are vehicles including the general vehicles with a rider striding over the vehicle body and including not only the motorcycles (including motorized bicycles) but also three-wheeled vehicles and four-wheeled vehicles classified into ATVs (All Terrain Vehicles).

REFERENCE SIGNS LIST

10 . . . Motorcycle (saddle-ride type vehicle)
31 . . . Internal combustion engine
31A . . . Front bank
31B . . . Rear bank
63 . . . Supercharger
81 . . . Crankcase
82 . . . Crankshaft
83 . . . Power transmission portion
91 . . . Front cylinder block (cylinder block)
91a, 96a . . . Cylinder
92 . . . Front cylinder head (cylinder head)
96 . . . Rear cylinder block (cylinder block)
97 . . . Rear cylinder head (cylinder head)
103 . . . Drive shaft
103a . . . Cam lobe
109 . . . Driven gear
116 . . . Case cover
117 . . . High-pressure fuel pump
118 . . . Drive gear
132 . . . TBW throttle device
132a . . . Electric motor (actuator)
132b, 133b . . . Throttle valve
133 . . . Throttle device
136 . . . Upstream connecting tube (pipe)
138 . . . Bypass valve device
144 . . . Rod (coupling member)
158 . . . Air cleaner case

The invention claimed is:

1. An internal combustion engine with a supercharger for a saddle-ride type vehicle, the supercharger being arranged above a crankcase positioned below a cylinder head,
   wherein the crankcase is covered with a case cover from the outside in a vehicle width direction,
   wherein the supercharger is supported by the case cover,
   wherein the internal combustion engine is a direct injection internal combustion engine for directly injecting fuel into a cylinder provided with respect to a cylinder block,
   wherein a high-pressure fuel pump for fuel injection is attached to the case cover, and the high-pressure fuel pump is also arranged to overlap with the cylinder block in a side view,
   wherein a drive shaft is rotatably supported by the crankcase,
   wherein the drive shaft is formed with a cam lobe for driving the high-pressure fuel pump, and
   wherein rotation of the crankshaft is transmitted to the drive shaft by engaging a drive gear and a driven gear with each other, the drive gear being provided to the crankshaft, the driven gear being provided to the drive shaft.

2. The internal combustion engine with a supercharger for a saddle-ride type vehicle according to claim 1, wherein the supercharger is transmitted with power through a power transmission portion from a crankshaft stored in the crankcase, and
   wherein the case cover is a power transmission portion cover for covering the power transmission portion.

3. The internal combustion engine with a supercharger for a saddle-ride type vehicle according to claim 2, the internal combustion engine being a direct injection internal combustion engine for directly injecting fuel into a cylinder provided with respect to a cylinder block,
   wherein the high-pressure fuel pump for fuel injection is attached to the case cover, and the high-pressure fuel pump is also arranged to overlap with the cylinder block in a side view.

4. The internal combustion engine with a supercharger for a saddle-ride type vehicle according to claim 1, wherein an air cleaner case is arranged above the cylinder head, and
   wherein a bypass valve device and a TBW throttle device are arranged between the air cleaner case and the cylinder head, the bypass valve device adjusting supercharging pressure of the supercharger, the TBW throttle device opening/closing a throttle valve by an actuator according to a throttle signal.

5. The internal combustion engine with a supercharger for a saddle-ride type vehicle according to claim 4, wherein the bypass valve device and the TBW throttle device overlap with each other in the side view.

6. The internal combustion engine with a supercharger for a saddle-ride type vehicle according to claim 2, wherein an air cleaner case is arranged above the cylinder head, and
   wherein a bypass valve device and a TBW throttle device are arranged between the air cleaner case and the cylinder head, the bypass valve device adjusting supercharging pressure of the supercharger, the TBW throttle device opening/closing a throttle valve by an actuator according to a throttle signal.

7. The internal combustion engine with a supercharger for a saddle-ride type vehicle according to claim 5, wherein the internal combustion engine is a V-type internal combustion engine including a front bank and a rear bank, wherein one of the front bank and the rear bank is provided with the TBW throttle device, wherein the other of the front bank and the rear bank is provided with a throttle device, wherein throttle valves are interlocked with each other by a coupling member, the throttle valves being respectively provided to the TBW throttle device and the throttle device, and wherein the coupling member is arranged inside of a pipe in the vehicle width direction, the pipe being connected to the supercharger.

8. The internal combustion engine with a supercharger for a saddle-ride type vehicle according to claim 5, wherein the case cover is provided with a crankcase cover portion and a gear storage portion, the crankcase cover portion covering a lateral side of the crankcase, the gear storage portion protruding outward of the crankcase cover portion in the vehicle width direction, the gear storage portion storing a gear included in the power transmission portion, and wherein the high-pressure fuel pump is arranged outside of the crankcase cover portion in the vehicle width direction, and the high-pressure fuel pump is also attached to a rear portion of the gear storage portion.

9. The internal combustion engine with a supercharger for a saddle-ride type vehicle according to claim 4, wherein the internal combustion engine is a V-type internal combustion engine including a front bank and a rear bank, wherein one of the front bank and the rear bank is provided with the TBW throttle device, wherein the other of the front bank and the rear bank is provided with a throttle device, wherein throttle valves are interlocked with each other by a coupling member, the throttle valves being respectively provided to the TBW throttle device and the throttle device, and wherein the coupling member is arranged inside of a pipe in the vehicle width direction, the pipe being connected to the supercharger.

10. The internal combustion engine with a supercharger for a saddle-ride type vehicle according to claim 4, wherein the case cover is provided with a crankcase cover portion and a gear storage portion, the crankcase cover portion covering a lateral side of the crankcase, the gear storage portion protruding outward of the crankcase cover portion in the vehicle width direction, the gear storage portion storing a gear included in the power transmission portion, and wherein the high-pressure fuel pump is arranged outside of the crankcase cover portion in the vehicle width direction, and the high-pressure fuel pump is also attached to a rear portion of the gear storage portion.

11. The internal combustion engine with a supercharger for a saddle-ride type vehicle according to claim 9, wherein the case cover is provided with a crankcase cover portion and a gear storage portion, the crankcase cover portion covering a lateral side of the crankcase, the gear storage portion protruding outward of the crankcase cover portion in the vehicle width direction, the gear storage portion storing a gear included in the power transmission portion, and wherein the high-pressure fuel pump is arranged outside of the crankcase cover portion in the vehicle width direction, and the high-pressure fuel pump is also attached to a rear portion of the gear storage portion.

12. The internal combustion engine with a supercharger for a saddle-ride type vehicle according to claim 1, the internal combustion engine being a V-type internal combustion engine including a front bank and a rear bank, wherein the supercharger is arranged between the front bank and the rear bank.

13. The internal combustion engine with a supercharger for a saddle-ride type vehicle according to claim 12, wherein one of the front bank and the rear bank is provided with the TBW throttle device, wherein the other of the front bank and the rear bank is provided with a throttle device, wherein throttle valves are interlocked with each other by a coupling member, the throttle valves being respectively provided to the TBW throttle device and the throttle device, and wherein the coupling member is arranged inside of a pipe in the vehicle width direction, the pipe being connected to the supercharger.

14. The internal combustion engine with a supercharger for a saddle-ride type vehicle according to claim 12, wherein the case cover is provided with a crankcase cover portion and a gear storage portion, the crankcase cover portion covering a lateral side of the crankcase, the gear storage portion protruding outward of the crankcase cover portion in the vehicle width direction, the gear storage portion storing a gear included in the power transmission portion, and wherein the high-pressure fuel pump is arranged outside of the crankcase cover portion in the vehicle width direction, and the high-pressure fuel pump is also attached to a rear portion of the gear storage portion.

15. The internal combustion engine with a supercharger for a saddle-ride type vehicle according to claim 1, wherein the case cover is provided with a crankcase cover portion and a gear storage portion, the crankcase cover portion covering a lateral side of the crankcase, the gear storage portion protruding outward of the crankcase cover portion in the vehicle width direction, the gear storage portion storing a gear included in the power transmission portion, and wherein the high-pressure fuel pump is arranged outside of the crankcase cover portion in the vehicle width direction, and the high-pressure fuel pump is also attached to a rear portion of the gear storage portion.

16. An internal combustion engine with a supercharger for a saddle-ride type vehicle, the supercharger being arranged above a crankcase positioned below a cylinder head, wherein the crankcase is covered with a case cover from the outside in a vehicle width direction, wherein the supercharger is supported by the case cover, wherein an air cleaner case is arranged above the cylinder head, wherein a bypass valve device and a TBW throttle device are arranged between the air cleaner case and the cylinder head, the bypass valve device adjusting supercharging pressure of the supercharger, the TBW throttle device opening/closing a throttle valve by an actuator according to a throttle signal, wherein the internal combustion engine is a V-type internal combustion engine including a front bank and a rear bank, wherein one of the front bank and the rear bank is provided with the TBW throttle device, wherein the other of the front bank and the rear bank is provided with a throttle device, wherein throttle valves are interlocked with each other by a coupling member, the throttle valves being respectively provided to the TBW throttle device and the throttle device, and wherein the coupling member is arranged inside of a pipe in the vehicle width direction, the pipe being connected to the supercharger.

\* \* \* \* \*